United States Patent [19]

Miyahra et al.

[11] 4,447,677

[45] May 8, 1984

[54] HEARING AID

[75] Inventors: Katsunobu Miyahra, Tokyo; Nobuyuki Matsumoto, Yokohama, both of Japan

[73] Assignee: Sony Corporation, Tokyo, Japan

[21] Appl. No.: 367,214

[22] Filed: Apr. 9, 1982

[30] Foreign Application Priority Data

Apr. 20, 1981 [JP] Japan .................................. 56-56687

[51] Int. Cl.³ .............................................. H04R 25/00

[52] U.S. Cl. .......................... 179/107 R; 179/107 FD

[58] Field of Search ........ 179/107 R, 107 FD, 107 E, 179/107 H, 139

[56] References Cited

U.S. PATENT DOCUMENTS 3,749,853 7/1973 Ely .............................. 179/107 FD

FOREIGN PATENT DOCUMENTS 2236968 7/1972 Fed. Rep. of Germany............179/107 FD 2330073 9/1975 Fed. Rep. of Germany............179/107 FD

*Primary Examiner*—A. D. Pellinen

*Assistant Examiner*—L. C. Schroeder

*Attorney, Agent, or Firm*—Hill, Van Santen, Steadman & Simpson

[57] ABSTRACT

A hearing aid has a reproducing transducer and a microphone each having a diaphragm and a sound conduction opening and being closed hermetically except for said sound conduction opening. The reproducing transducer and the microphone are so mounted and accommodated in a housing that the vibration planes of the respective diaphragms are not parallel to each other, and the respective sound conduction openings may be directed towards the outside of the housing.

5 Claims, 7 Drawing Figures

HEARING AID

BACKGROUND OF THE INVENTION

1. Field of the Invention

This invention relates to a hearing aid and, more particularly, to a hearing aid in which a reproducing transducer and a microphone are enclosed in one and the same housing.

2. Description of the Prior Art

In a conventional hearing aid wherein a reproducing transducer and a microphone are enclosed in one housing and are used at the same time, vibrations on the transducer side may be transmitted through the housing to the microphone side, thus resulting a resonance and deteriorated sound pickup sensitivity of the microphone. On the other hand, vibrations caused in the microphone due to its sound pickup operation may be transmitted through the housing to the reproducing transducer thus causing a resonance at the transducer and deteriorating its sound reproducing characteristics.

Moreover, when the transducer side vibrations are transmitted through the housing to the microphone side, the resulting resonance may be picked up by the microphone thus causing an acoustic feedback phenomenon known as howling.

Thus, in a certain prior art hearing aid, the transducer and the microphone are separated from each other by a partition wall mounted in the housing and are closely fitted in the housing by the medium of resilient rubber sheets for prohibiting transducer or microphone vibrations from being transmitted to the microphone or transducer through the housing and other connecting portions.

However, we have found that such separation of the transducer and the microphone by the partition wall and mounting them in the housing by the medium of rubber sheets or the like resilient means are not sufficient in general to prevent resonance from occurring between the transducer and the microphone and to prevent deterioration in their sound reproducing and sound pickup characteristics. Moreover, howling can not be prevented from occurring in such prior devices due to insufficient suppression of the resonance between the reproducing transducer and the microphone.

In another conventional hearing aid, the transducer and the microphone are mounted with a close fit between the housing wall and a support base plate by the medium of cushioning sheets made of rubber and similar resilient material and having plural peripheral projections, said base plate being provided in the housing and adapted for mounting of electrodes and other devices. Thus, vibrations produced at the transducer and microphone sides may be diffused or occasionally absorbed by these projections. However, since the vibrations per se may not be absorbed completely, such known device again is not sufficient to prevent the resonance between the transducer and the microphone and resulting howling, thus again giving rise to deterioration in the sound reproducing characteristics of the transducer and the sound pickup performance of the microphone.

OBJECTS AND SUMMARY OF THE INVENTION

It is therefore a primary object of the present invention to provide a hearing aid which is free from these disadvantages.

It is another object of the present invention to provide a hearing aid in which, even in case of resonance occurring at the microphone due to transducer vibrations being transmitted through the housing to the microphone, such resonance may not be picked up by the microphone.

It is a further object of the present invention to provide a hearing aid which may not be liable to trouble due to special provision of a battery casing between the housing portions accommodating the transducer and the microphone.

The hearing aid of the present invention comprizes a housing, a microphone for converting a sound into an electrical signal, said microphone being mounted in said housing and having a diaphragm, and a reproducing transducer for converting said electrical signal into sound, said reproducing transducer being also mounted in said housing and having a diaphragm. The diaphragm of said microphone and said reproducing transducer are placed in different locations and their vibration planes are place at a certain angle relative to each other.

Other objects, features and advantages of the present invention will be apparent from the following descriptions taken in conjunction with the accompanying drawings.

DETAILED DESCRIPTION OF THE PREFERRED EMBODIMENTS

Reference is now made to the accompanying drawings for illustration of the preferred embodiments of the present invention.

Figure 1:
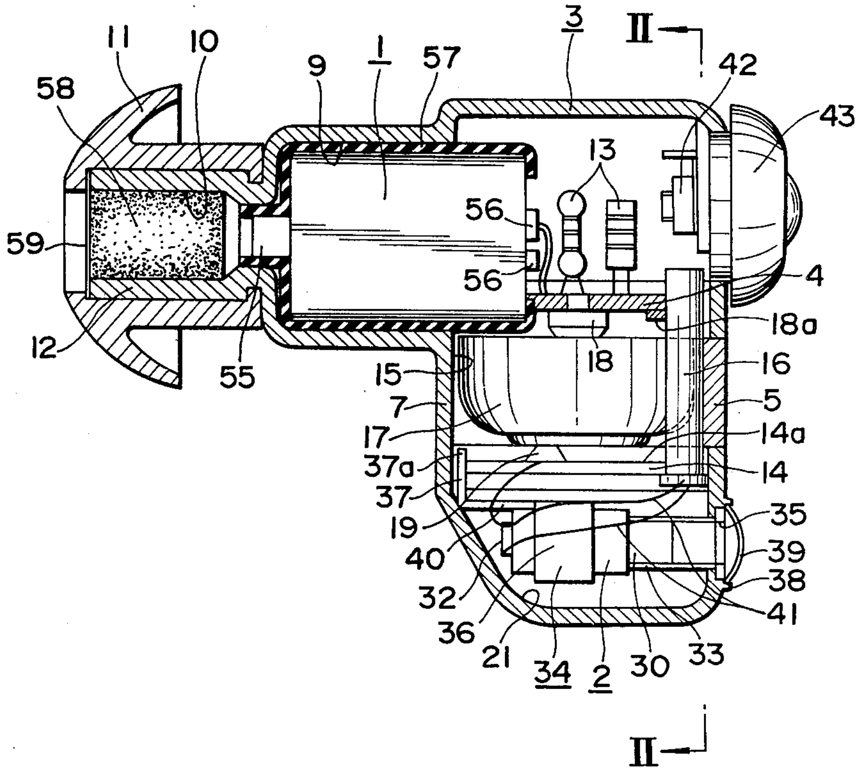
FIG. 1 is a longitudinal section showing an embodiment of the hearing aid according to the present invention.

FIG. 1 is a sectional side elevation showing an electronic device of the present invention, that is, a hearing aid of the type introduced into user's ears.

Figure 2:
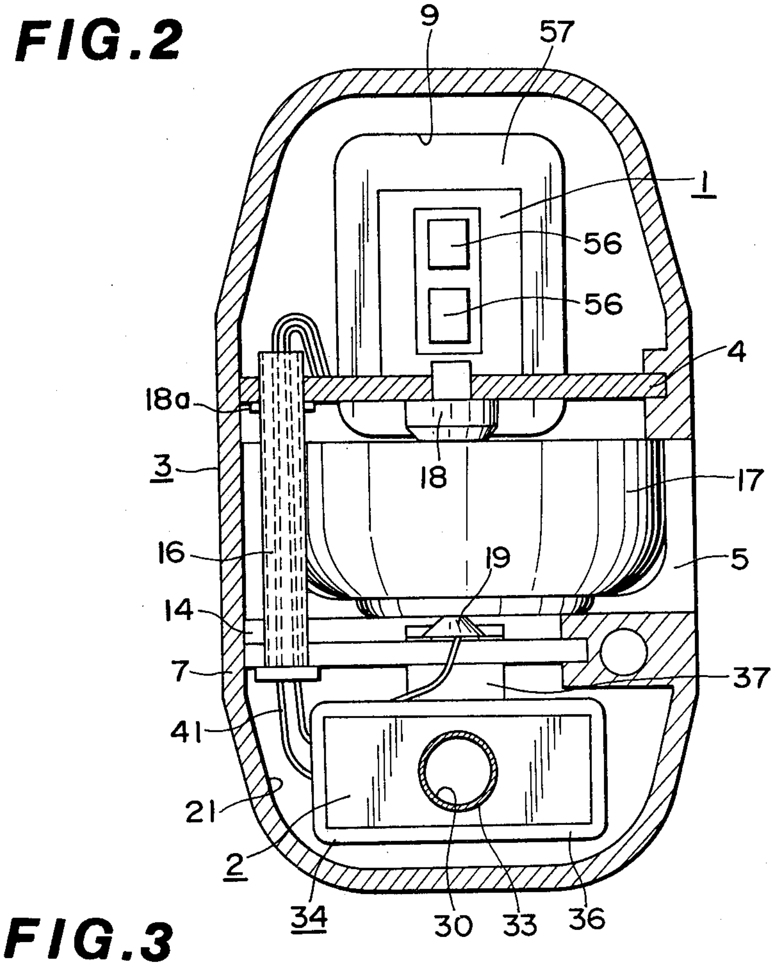
FIG. 2 is an enlarged sectional view taken along line II—II of FIG. 1.

FIG. 2 is a sectional rear view of the device. The hearing aid has a housing 3 for accommodating a reproducing transducer 1 for converting an electrical signal into sound and a microphone 2 for converting sound into an electrical signal. The housing 3 is composed of a main housing portion 7 in which a main circuit board 4, including a main electronic circuit of the hearing aid, such as amplifiers, a battery casing 5 and a microphone 2 are accommodated. A transducer enclosing portion 9 is formed integrally with and projecting from the upper side of the main housing portion 7 and enclosing the transducer 1. A tubular extension 12 extends from said enclosing portion 9 for providing a sound conduction path 10 and has fitted thereto an ear plug 11 adapted to be introduced into the user's ear.

In approximately the center of the main portion 7 of the housing 3, the main circuit board 4, on which electronic elements or devices 13 of the electronic circuit are provided, is mounted for traversing said main portion 7. In the lower part of the main housing portion 7, an auxiliary circuit board 14 is mounted in opposition to the main circuit board 4. A battery enclosing portion 15 is defined between the main and auxiliary circuit boards 4, 14 and a battery closure 5 is carried for rotation by a pin 16 fixedly mounted in turn to said circuit boards 4, 14. A battery 17 is enclosed in said enclosing portion 15 and electrically connected to a plus electrode 18 mounted in turn on the main circuit board 4 positioned above auxiliary circuit board 14. A minus electrode 19 is mounted at the foremost part of a terminal plate 14 of the circuit board 14. For electrically connecting the electrodes 18, 19 to each other, an electrically conductive pattern 18 and the terminal plate 14 extended respectively on the circuit boards 4, 14 from the electrodes 18, 19 are electrically connected with the pin 16 which is made of an electrically conductive material.

Figure 3:
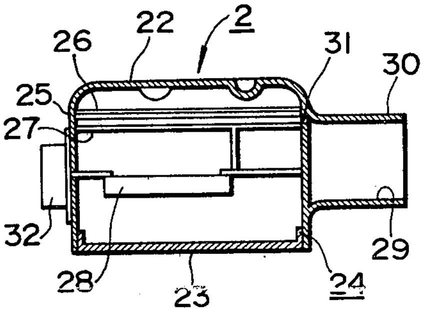
FIG. 3 is an enlarged longitudinal section of a microphone shown in FIG. 1.

In the lowermost portion of the main housing portion 7, that is, below the circuit board 14, a microphone mounting portion 21 is defined, and a microphone 2 is contained in the portion 21. The microphone 2 comprises a static microphone and, as shown in FIG. 3, has an enclosure 24 composed of an upper enclosure portion 22 and a lower enclosure portion 23, said enclosure 24 enclosing a fixed diaphragm ring 25, a diaphragm 25 mounted under tension on a front side of the conduction opening 29 is projectingly mounted to one side of the enclosure 24 for communication with the space between the diaphragm 26 and the back-side electrode 27 via a through-hole 31 in the enclosure 24. A terminal plate 32 for connection to the outside is mounted to the other side of the enclosure 24. Thus the microphone 2 is hermetically sealed except for the sound conduction opening 29.

The microphone 2 is contained in the housing 3 so that the plane of the diaphragm 26 traverses said housing 3, that is, said plane is substantially parallel to the main circuit board 4. In addition, the microphone 2 is mounted in the housing 3 by a tubular holding member 33 made of rubber or the like resilient material and a support member 34 also made of rubber or the like resilient material and fitted about the peripheral surface of a central portion of the enclosure 24. Thus, the free end of the tubular holding member is fitted into the sound pick-up opening 35 in the housing 3, while the free end 37*a* of an elongated L-shaped support piece 37 extending from a fitting portion 36 of the support member 34 into the enclosure 24 is secured to the auxiliary circuit board for supporting the diaphragm in the housing.

The housing 3 has a sound pickup opening 35, and a dust-proofing microphone net 39 is fitted to a flange portion 38 encircling said collection opening 35.

The terminal plate 32 of the microphone 2 and the minus electrode 19 are interconnected by a lead 40, while the terminal plate 32 and a predetermined circuit pattern on the main circuit board 4 are similarly interconnected by a lead 41. In the present embodiment, the main portion 7 of the housing 3 is divided into a mounting portion for electronic devices or elements, the battery enclosing portion 15 and the microphone mounting portion 21, by the main and auxiliary circuit boards 4, 14. The lead 41 which acts as a jumper for connecting the terminal plate 32 of the microphone 2 in the microphone mounting portion 21 to the associated circuit pattern on the main circuit board 4, is passed through the column 16 as best shown in FIG. 2. Thus, as shown in FIGS. 3 and 5, the lead wire is not exposed in the battery mounting portion 15 and there is no risk of lead breakage on manual rotation of the battery closure 5.

In the portion of the main housing portion 7 adapted for mounting of the electronic devices, a volume control knob 43 is mounted stationarily to a nut 42 mounted in turn to the side wall of the housing 3.

Figure 4:
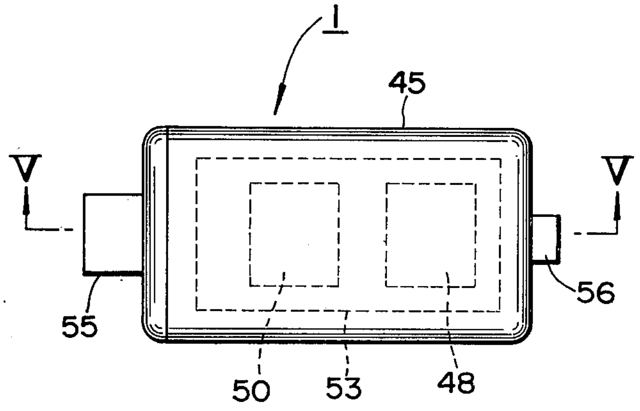
FIG. 4 is an enlarged plan view of a reproducing transducer shown in FIG. 1.
Figure 5:
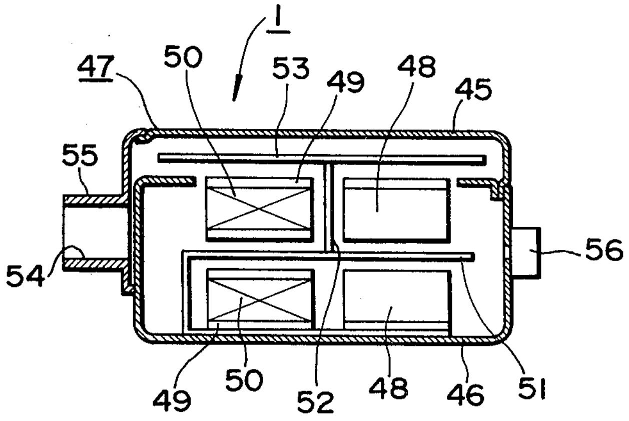
FIG. 5 is a section taken along line V—V in FIG. 4.

As shown in FIGS. 4 and 5, the reproducing transducer 1 mounted in the enclosing portion 9 of the housing 3 has a casing 47 comprized of an upper casing 45 and a lower casing 46, a pair of magnets 48, 48 provided in the casing 47, a pair of coils 50, 50 wound on bobbins 49, 49 and provided in the casing 47, an armature 51 placed between said magnets 48, 48 and coils 50, 50 and a diaphragm 53 mounted to said armature 51 by the intermediary of a contact piece 52. The diaphragm 53 may be driven into oscillation under the magnetic force produced in the coils 50, 50 and in the magnets 48, 48 and transmitted to the armature 51. A tubular portion 55 providing a sound conduction opening 54 is projectingly mounted to one side of the casing 47 of the transducer 1, and a terminal plate 56 for external electrical connection is mounted to the other side of the casing 47. The transducer 1 is also hermetically sealed except the sound conduction opening 54.

In the above arrangement, the reproducing transducer 1 is fitted in the enclosing portion 9 so that the plane of the diaphragm 53 is not parallel to that of the diaphragm 26 of the microphone 2. In the present embodiment, the plane of the diaphragm 53 is substantially at right angles with the plane of the diaphragm 26. The transducer 1 has its casing 47 and the tubular portion 55 sheathed by a lining 57 made of rubber or similar resilient material, and is fitted closely in the enclosing portion 9 under the resilient compressive force of the lining 57 compacted between the inner housing wall and the casing 47. The reproducing transducer 1 is arranged in the enclosing portion 9 with the tubular portion 55 facing to the sound conduction path 10 of the tubular extension 12. A dust-proofing sponge element 58 fitted in the path 10 operates for preventing intrusion of dust and dirt into transducer 1 in cooperation with a dust-proofing cloth 59.

It is to be noted that, as shown in FIG. 4, the diaphragm 53 of the reproducing transducer 1 has its plane extending parallel to the drawing paper, and the diaphragm of the reproducing transducer means 1 shown in FIG. 1 also has its plane parallel to the drawing paper. On the other hand, the diaphragm 26 of the microphone 2 shown in FIG. 2 has its plane extending vertically with respect to the drawing paper, and the diaphragm of the microphone 2 shown in FIG. 1 has similarly its plane extending vertically with respect to the drawing paper. Thus it will be understood that the diaphragm 53 of the reproducing transducer 1 and the diaphragm 26 of the microphone 2 are positioned in the planes extending at right angles to each other. Thus in operation of the present hearing aid, the sound waves picked up in the sound pickup opening 35 in FIG. 1 act for vertically oscillating the diaphragm of the microphone 2 mounted vertically with respect to the drawing paper, thus causing a change in the interval between the diaphragm and the back-side electrode. The microphone 2 delivers an output electrical signal in accordance with such change and the output signal is then amplified by an amplifier mounted on the main circuit board 4 to be supplied to reproducing transducer 1. As the electrical signal is supplied to the coils 50, 50 of the transducer 1, the magnetic field caused by the magnets 48, 48 is affected by the coil current, so that the diaphragm 53 mounted parallel to the drawing paper of FIG. 1 is set into oscillation. Thus the sound wave is reproduced and conducted through sound conduction path 10 to the user's ear.

Figure 6:
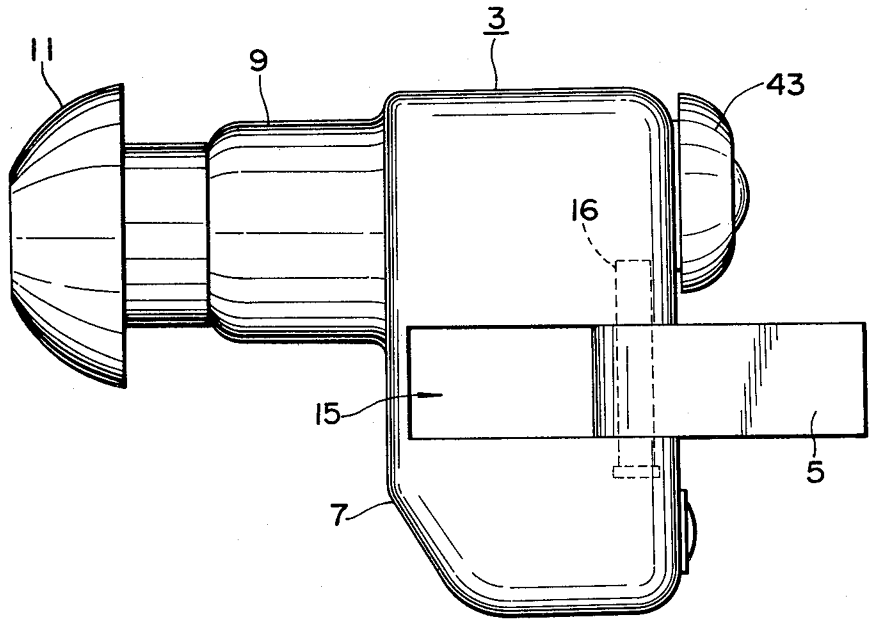
FIG. 6 is a an elevational view of the embodiment shown in FIG. 1.

When replacing a battery 17, the battery closure 5 is swung with the pivot 16 as center and drawn out of the housing 3 through the space between the circuit boards 4, 14, as shown in FIG. 6. By drawing the battery closure 5 out of the housing 3 in this way, battery exchange operation can be made very easily. As described above since the lead 41 is contained in the pivot 16, no injury may be made to the lead during battery exchange operation and hence the risk of lead breakage may be precluded.

Figure 7:
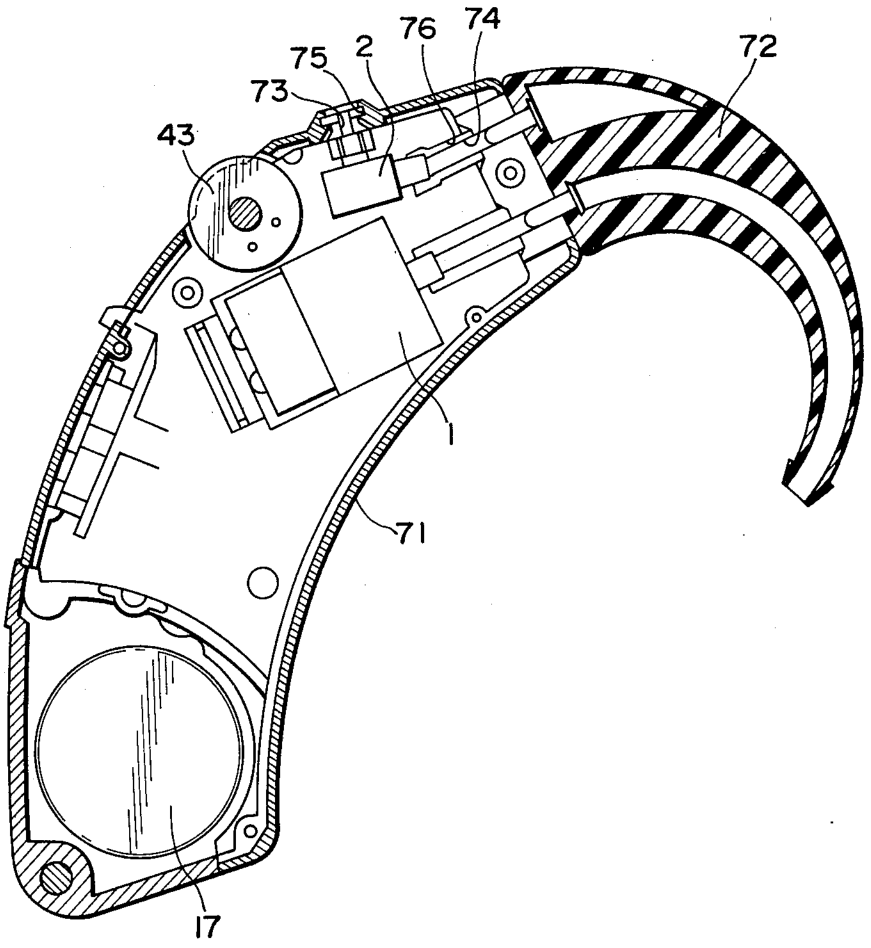
FIG. 7 is a longitudinal section showing a hearing aid according to a modification.

FIG. 7 shows an embodiment of the present invention applied to a hearing aid of the type carried by the user's ear. The hearing aid of the present embodiment has a main housing portion 71 for accommodating a reproducing transducer 1, a microphone 2, a battery 17 and a volume control knob 43 etc. The housing portion 71 has a curved shape such that it can be fitted between the periphery of the auricular region and the head of the user, and an ear hook 72 is mounted to one end of the main housing 71. An ear plug, not shown, may be mounted to the end of ear hook 72.

In this embodiment, the transducer 1 and the microphone 2 are accommodated in the main housing portion 71 in such a manner that the planes of the respective diaphragms 26, 53 are not parallel and may as an example be at right angles to each other. Since the microphone 2 used in the present embodiment is directive, the microphone 2 has two sound conduction openings 73, 74 substantially at right angles to each other and facing respectively to sound pickup openings 75, 76 provided in the main housing portion 71. In the hearing aid of the type hung by the user's ears, by thus having the planes of the diaphragms 26, 53 of the transducer 1 and the microphone 2 arranged at right angles to each other, the plane of the diaphragm 53 that constitutes the wider surface of the transducer 1 may be made parallel to the longitudinal direction of the main housing portion 71. Hence, the housing portion 71 may be thin and narrow in width so that the hearing aid may be worn agreeably when the portion 71 is fitted about the periphery of the user's auricular region.

As described above, since the diaphragms of the transducer and the microphone are placed so that their oscillation planes are not parallel to each other, oscillations of one diaphragm in the same mode do not affect the other diaphragm because of the difference in resonance modes. In addition, oscillations of one diaphragm transmitted through the housing do not affect the other diaphragm because of the difference in the vibrating directions. Thus the hearing aid of the present invention exhibits optimum accoustic properties through effective prevention of resonance and resulting howling.

According to the present invention, since the microphone is suspendedly mounted in a microphone mounting portion of the main housing by the elongated holding member made of resilient material and the support member, any vibrations generated in the transducer and transmitted through the housing may be absorbed positively by said holding member and support member. Thus, no vibrations may be transmitted from the transducer to the microphone thus preventing resonance or deterioration in microphone sensitivity. Similarly, any microphone vibrations may be absorbed by said holding and support members and hence may not be transmitted to the transducer, thus preventing resonance between the microphone and the transducer or deterioration in reproduction characteristics of the transducer. Moreover, since the mounting member extended from the support member is secured to the battery-loaded auxiliary circuit board with a high Q, vibrations may be absorbed more positively.

Since the lead 41 extended across the battery mounting portion 15 containing the battery closure 5 is passed through the fixed pivot 16, the lead 41 may not be projected into the interior of the battery mounting portion 15 when the closure 5 has been rotated out of the housing 3 to a battery exchange position shown in FIG. 5. The lead 41 may not be twisted or contacted by the battery closure 5 when it has again been rotated to the use position shown in FIGS. 1 and 2.

The present invention thus makes it possible to prevent the damage or breaking of the lead or other jumper contained in the housing of the hearing aid, thus reducing the occurrence of trouble and facilitating the operation of the device.

We claim as our invention:

1. A hearing aid comprising a housing, a microphone for converting a received sound into an electrical signal, said microphone being mounted in said housing and having a first diaphragm, and a reproducing transducer for converting said electrical signal into sound, said reproducing transducer being mounted in said housing and having a second diaphragm, wherein the first diaphragm and second diaphragm are placed in different locations and their respective planes of vibrations are placed at an angle relative to each other, and wherein said microphone is supported by a supporting member made of an elastic material, said supporting member comprising a first portion fixed to a solid member and a second portion connected to said first portion at a predetermined angle and having a free end, and said microphone is placed on said second portion.

2. The hearing aid as claimed in claim 1 wherein vibrations of the microphone are transmitted to an opening in said housing through a tubular member made of resilient material, and wherein said tubular member is positioned between said microphone and said opening in said housing for elastically supporting said microphone.

3. A hearing aid comprising a housing, a microphone for converting a received sound into an electrical signal, said microphone being mounted in said housing and having a first diaphragm, and a reproducing transducer for converting said electrical signal into sound, said reproducing transducer being mounted in said housing and having a second diaphragm, wherein the first diaphragm and second diaphragm are placed in different locations and their respective planes of vibrations are placed at an angle relative to each other, and wherein first and second circuit board members are mounted in said housing and spaced apart from each other for defining a space therebetween, and a battery is mounted in said space for separating said microphone from the reproducing transducer.

4. A hearing aid comprising a housing, a microphone for converting a received sound into an electrical signal, said microphone being mounted in said housing and having a first diaphragm, and a reproducing transducer for converting said electrical signal into sound, said reproducing transducer being mounted in said housing and having a second diaphragm, wherein the first diaphragm and second diaphragm are placed in different locations and their respective planes of vibrations are placed at an angle relative to each other, and wherein said housing has a battery closure member between the microphone mounting portion and the reproducing transducer mounting portion said battery closure member being rotatably carried by a column mounted in said housing.

5. The hearing aid as claimed in claim 4 wherein said column is hollow, said battery closure member is positioned between said first and second circuit board members mounted in the housing and having contacts for said battery, and wherein a lead connecting from one of said contacts to an amplifier is passed through said column.

* * * * *